United States Patent
Crane et al.

(10) Patent No.: US 9,602,807 B2
(45) Date of Patent: Mar. 21, 2017

(54) SINGLE FREQUENCY TIME OF FLIGHT DE-ALIASING

(71) Applicant: Microsoft Technology Licensing, LLC, Redmond, WA (US)

(72) Inventors: Randall T. Crane, Windsor, CO (US); Rod G. Fleck, Bellevue, WA (US); Jedd Perry, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 561 days.

(21) Appl. No.: 13/720,396

(22) Filed: Dec. 19, 2012

(65) Prior Publication Data

US 2014/0168369 A1 Jun. 19, 2014

(51) Int. Cl.
| | |
|---|---|
| *G01S 17/08* | (2006.01) |
| *H04N 13/02* | (2006.01) |
| *G01S 17/36* | (2006.01) |
| *G01S 17/89* | (2006.01) |
| *G01S 7/486* | (2006.01) |
| *G01S 7/491* | (2006.01) |

(52) U.S. Cl.
CPC ......... *H04N 13/0253* (2013.01); *G01S 17/36* (2013.01); *G01S 17/89* (2013.01); *G01S 7/4865* (2013.01); *G01S 7/4915* (2013.01)

(58) Field of Classification Search
CPC ..... H04N 13/0253; G01S 17/36; G01S 17/89; G01S 7/4865; G01S 7/4915
See application file for complete search history.

(56) References Cited

U.S. PATENT DOCUMENTS

| | | | |
|---|---|---|---|
| 4,935,616 A | 6/1990 | Scott | |
| 5,266,956 A * | 11/1993 | Canal | G01S 13/343 342/128 |
| 7,012,248 B2 | 3/2006 | Paschalidis | |
| 7,262,863 B2 * | 8/2007 | Schmidt | G01S 7/491 356/3 |
| 7,791,715 B1 * | 9/2010 | Bamji | G01C 3/08 356/4.01 |
| 2005/0156121 A1 * | 7/2005 | Bamji et al. | 250/492.2 |

(Continued)

FOREIGN PATENT DOCUMENTS

| | | |
|---|---|---|
| CN | 101326448 A | 12/2008 |
| CN | 102448564 A | 5/2012 |

OTHER PUBLICATIONS

Foix, et al., "Lock-in Time-of-Flight (ToF) Cameras : A Survey", In IEEE of Sensors Journal, vol. 11, Issue 3, Mar. 2011, 11 pages.

(Continued)

*Primary Examiner* — Christopher Findley
(74) *Attorney, Agent, or Firm* — Vierra Magen Marcus LLP

(57) ABSTRACT

A system and method are disclosed for determining a depth map using TOF with low power consumption. In order to disambiguate, or de-alias, the returned distance(s) for a given phase shift, the system may emit n different frequencies of light over n successive image frames. After n frames of data are collected, the distances may be correlated by a variety of methodologies to determine a single distance to the object as measured over n image frames. As one frequency may be emitted per image frame, the depth map may be developed while consuming low power.

9 Claims, 7 Drawing Sheets

(56) References Cited

U.S. PATENT DOCUMENTS

| | | | |
|---|---|---|---|
| 2005/0168719 A1* | 8/2005 | Stierle | G01S 17/36 |
| | | | 356/4.01 |
| 2010/0265489 A1 | 10/2010 | Seeger | |
| 2010/0302395 A1 | 12/2010 | Mathe et al. | |
| 2011/0205522 A1 | 8/2011 | Snow et al. | |
| 2011/0304842 A1 | 12/2011 | Kao et al. | |
| 2012/0075534 A1 | 3/2012 | Katz et al. | |

OTHER PUBLICATIONS

Conroy, et al., "A Power-Saving Modulation Technique for Time-of-Flight Range Imaging Sensors", In the proceedings of the International society for optics and photonics (SPIE), Jun. 11, 2011, pp. 13.

"World's Smallest Time-of-Flight Camera", 2010 CSEM; P-10. 2010; Retrieved on: Aug. 16, 2012, Available at: http://www.csem.ch/docs/show.aspx/13068/docname/CSEM_ARTTS_3D_TOF_Camera_DataSheet.pdf.

"International Search Report & Written Opinion for PCT Patent Application No. PCT/US2013/075974", Mailed Date: Mar. 14, 2014, Filed Date: Dec. 18, 2013, 12 Pages.

"Office Action and Search Report Issued in Chinese Patent Application No. 201380067311.3", Mailed Date: Jul. 18, 2016, 16 pages.

* cited by examiner

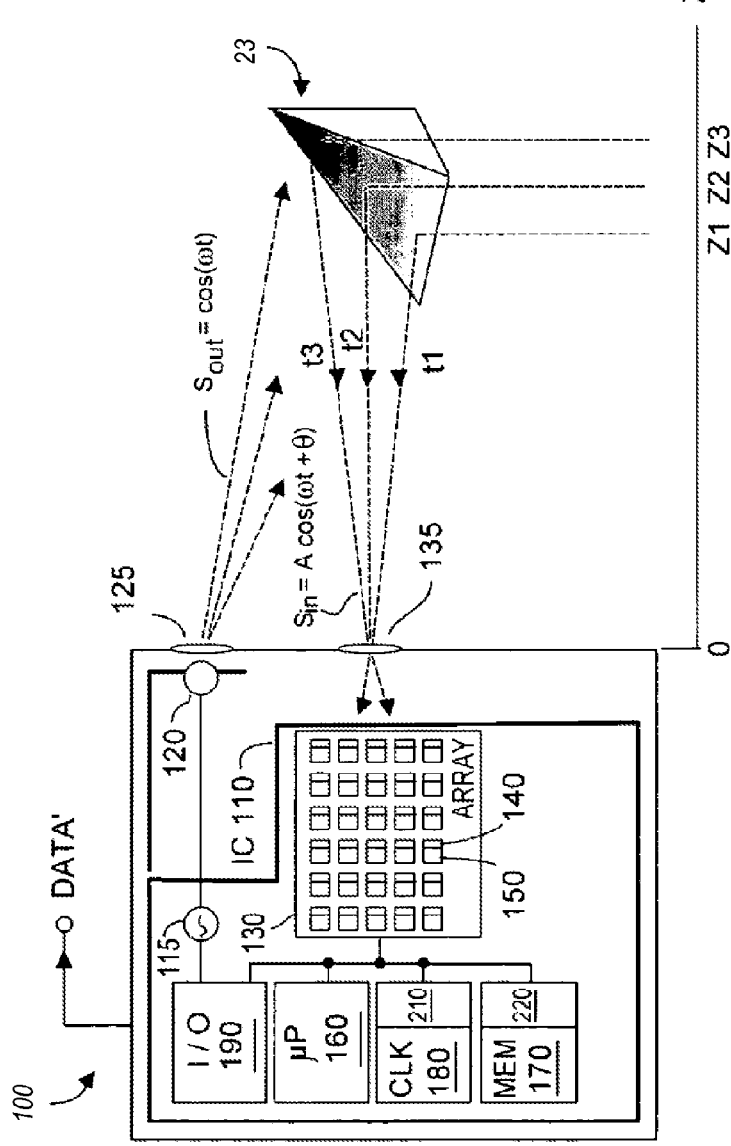
Fig. 3
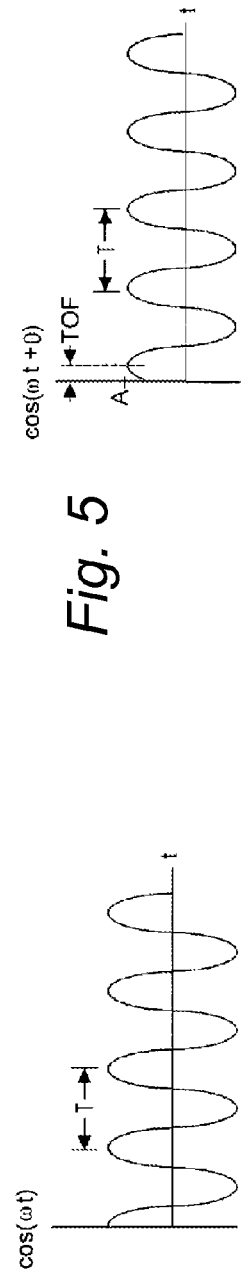
Fig. 4
Fig. 5

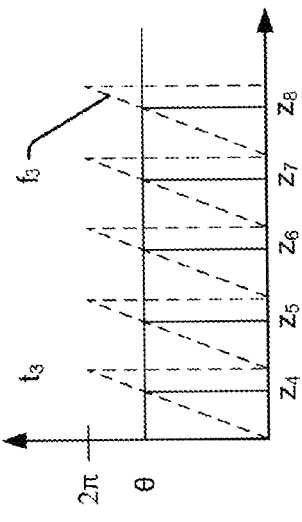
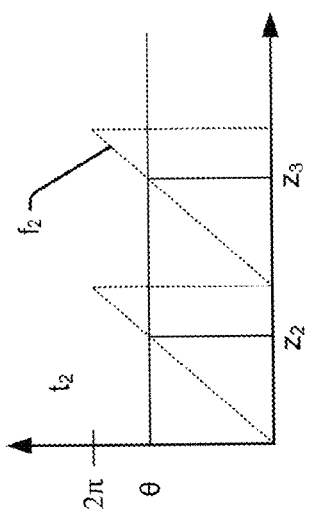
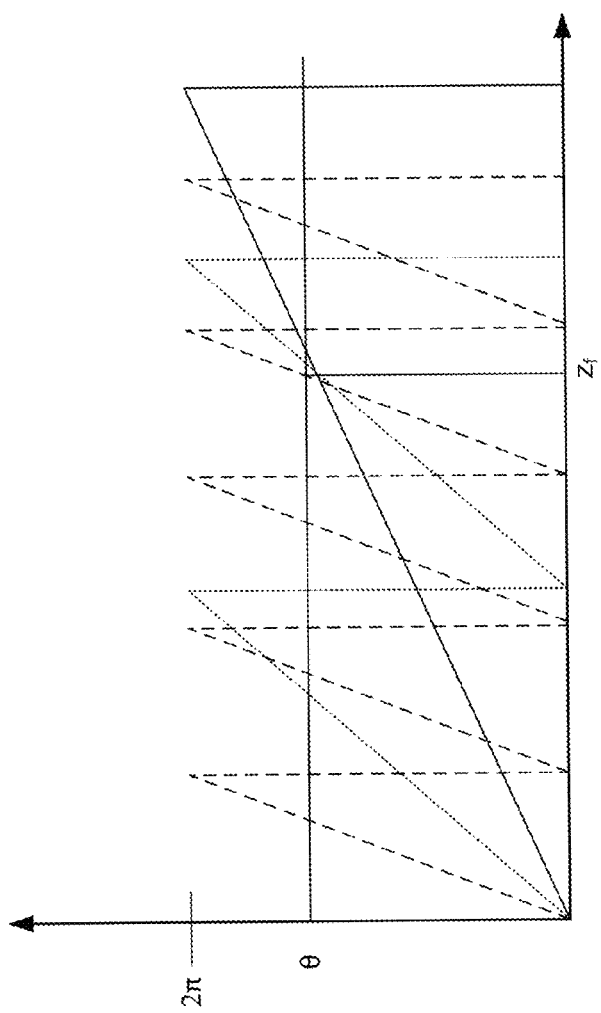
Fig. 7
Fig. 8
Fig. 9
Fig. 10

SINGLE FREQUENCY TIME OF FLIGHT DE-ALIASING

BACKGROUND

Gated three-dimensional (3-D) cameras, for example time-of-flight (TOF) cameras, provide distance measurements to objects in a scene by illuminating a scene and capturing reflected light from the illumination. The distance measurements make up a depth map of the scene from which a 3-D image of the scene is generated.

Conventional TOF systems ascertain depth distances (Z) to a target object by emitting modulated optical energy of a known frequency, f, and examining phase-shift in the optical signal reflected from the target object back to the TOF system. Exemplary such phase-type TOF systems are described in several U.S. patents received by Canesta, Inc., and now assigned to Microsoft, Inc. Such patents include U.S. Pat. No. 6,515,740 entitled "Methods for CMOS-Compatible Three-Dimensional Imaging Sensing Using Quantum Efficiency Modulation", U.S. Pat. No. 6,906,793 entitled Methods and Devices for Charge Management for Three Dimensional Sensing, U.S. Pat. No. 6,678,039 "Method and System to Enhance Dynamic Range Conversion Useable With CMOS Three-Dimensional Imaging", U.S. Pat. No. 6,587,186 "CMOS-Compatible Three-Dimensional Image Sensing Using Reduced Peak Energy", U.S. Pat. No. 6,580,496 "Systems for CMOS-Compatible Three-Dimensional Image Sensing Using Quantum Efficiency Modulation".

In practice, changes in Z produce a measurable change in phase shift, but eventually the phase shift begins to repeat, e.g., $\theta=\theta+2\pi$, etc. Thus, distance Z is known modulo $2\pi C/(2\omega)=C/(2f)$, where f is the modulation frequency. As such, there can be inherent ambiguity between detected values of phase shift, $\theta$, and distance Z.

It is known to disambiguate, or de-alias, the phase shift data by emitting light from the light source at multiple frequencies for each frame of image data. However, this operation results in a high consumption of power and mathematical computation, which may not be practical or optimal for certain TOF systems such as portable depth imaging systems.

SUMMARY

Disclosed herein are systems and methods for determining a depth map with low power consumption. In examples, the system includes a depth imaging system for determining a depth map using TOF methods. The depth imaging system includes a light source for emitting light at defined frequencies, and an array of pixel detectors for receiving light back light from the light source upon being reflected off of objects in the scene. Light reflected off of an object will be received in a pixel detector of the array with a phase shift indicative of a distance between the object and the depth imaging system, although there may be ambiguity between the returned distance(s) and the phase shift.

In order to disambiguate, or de-alias, the returned distance(s) for a given phase shift, the present technology may emit n different frequencies of light over n successive image frames, where n is an integer for example between two and four. The phase shift for each of the frequencies in each successive frame is measured and distances Z are computed for each phase shift. The distances Z for the different frequencies are stored, and after n frames of data are collected, the distances may be correlated by a variety of methodologies to determine a single distance to the object as measured over n image frames. As one frequency may be emitted per image frame, the depth map may be developed at a fraction of the power that conventional TOF depth maps are developed.

In an example, the present technology relates to a depth imaging system comprising: a light source for emitting light over a range of frequencies; an array of pixel detectors for receiving the light from the light source after reflection off of an object; and a processor determining phase shift data in light of a first frequency received in a pixel detector of the array of pixel detectors at a first time, and determining phase shift data in light of a second frequency received in the pixel detector at a second time, the second frequency being different than the first frequency and the second time being different than the first time, the processor de-aliasing the phase shift data to determine a distance to the object indicated by the first and second frequencies at the first and second times.

In another example, the present technology relates to a capture device of a target recognition, analysis, and tracking system, the depth imaging system comprising: an RGB camera; and a depth imaging system, comprising: a light source for emitting light over a range of frequencies, an array of pixel detectors for receiving the light from the light source after reflection off of an object, and a processor determining phase shift data in light of a first frequency received in a pixel detector of the array of pixel detectors in a first imaging frame, and determining phase shift data in light of a second frequency received in the pixel detector in a second image frame, the second frequency being different than the first frequency and the second image frame being the image frame after the first image frame, the processor de-aliasing the phase shift data to determine a distance to the object indicated by the first and second frequencies at the first and second times.

In a further example, the present technology relates to a method of determining distance between a depth imaging system and an object in a scene, comprising: (a) emitting light of a first frequency in a first time; (b) emitting light of a second frequency in a second time, the second frequency being different than the first frequency and the second time being after the first time; and (c) measuring distance to the object based on a phase shift of the light of the first frequency emitted at the first time, and light of the second frequency emitted at the second time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 3 is a block diagram of a sample depth imaging system according to embodiments of the present technology.

FIGS. 4 and 5 are graphs showing emitted and reflected optical energy waveforms associated with the imaging system of FIG. 3.

FIGS. 7 through 10 illustrate graphs showing phase shift versus distance for various modulation frequencies.

DETAILED DESCRIPTION

Embodiments of the present disclosure will now be described with reference to FIGS. 1-12, which in general relate to a system and method of low power generation of depth images. In embodiments, a frame of image data is generated by a light source of a TOC camera emitting a modulated pulse of light, and examining phase-shift in the optical signal reflected from a target object back to the TOF camera. In embodiments, the system de-aliases phase in the optical signal by emitting n different frequencies of light over n successive frames of image data. The system maintains state data for at least the n frames of image data, and correlates the phase-shift from the successive frames to de-alias the depth information. In examples, n may equal three, but it may be more or less than that in different examples.

Embodiments of the present disclosure may emit and detect pulsed-type periodic waveforms. However, embodiments may be described with respect to the emission and detection of sinusoidal waveforms, as such waveforms are rather easily analyzed mathematically. It is understood that periodic pulsed waveforms including imperfect sinusoidal waveforms may be used and represented mathematically as groupings of perfect sinusoidal waveforms of varying coefficients and frequency multiples.

Figure 1:
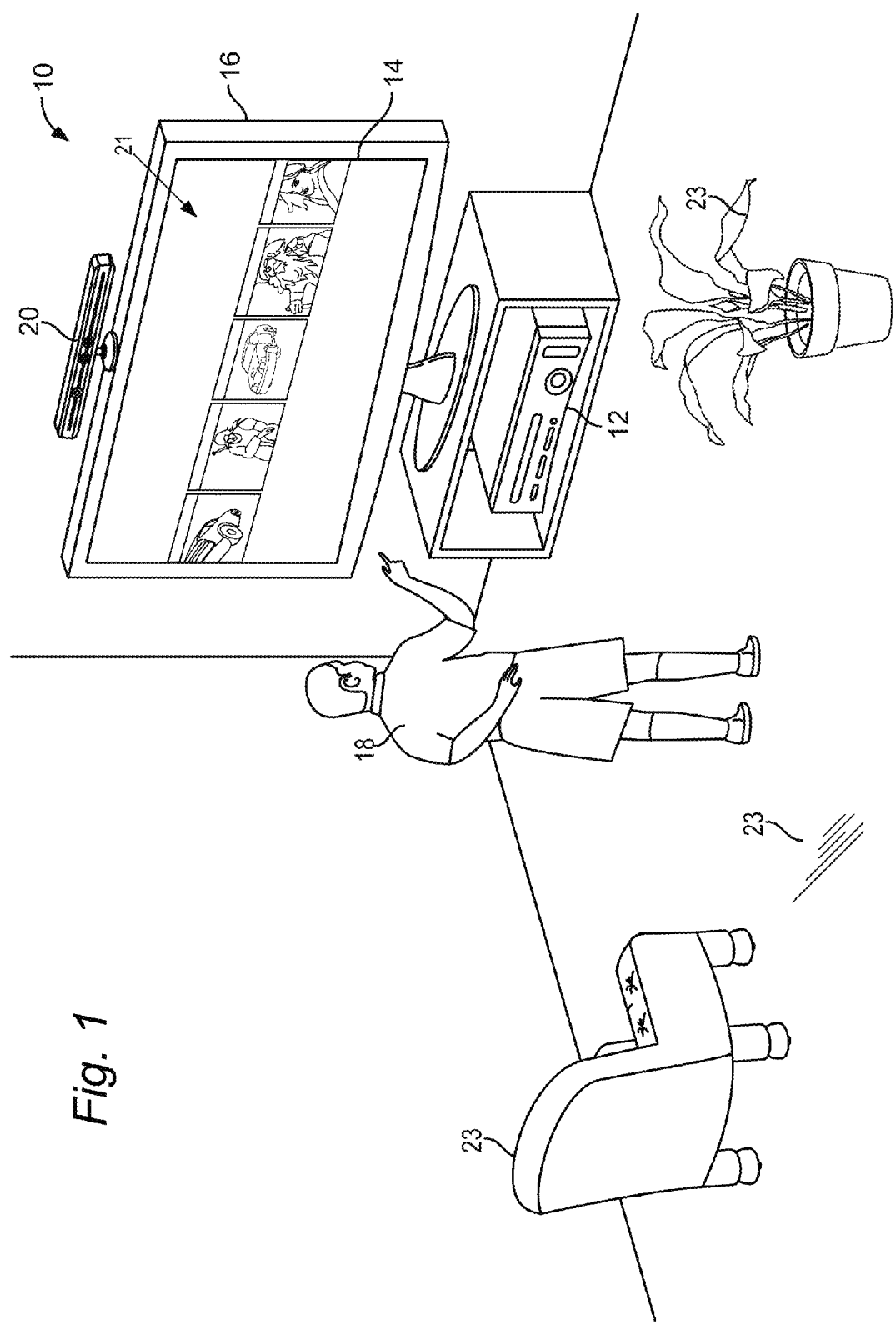
FIG. 1 illustrates an example embodiment of a target recognition, analysis, and tracking system in which a depth imaging system of the present technology may be used.
Figure 2:
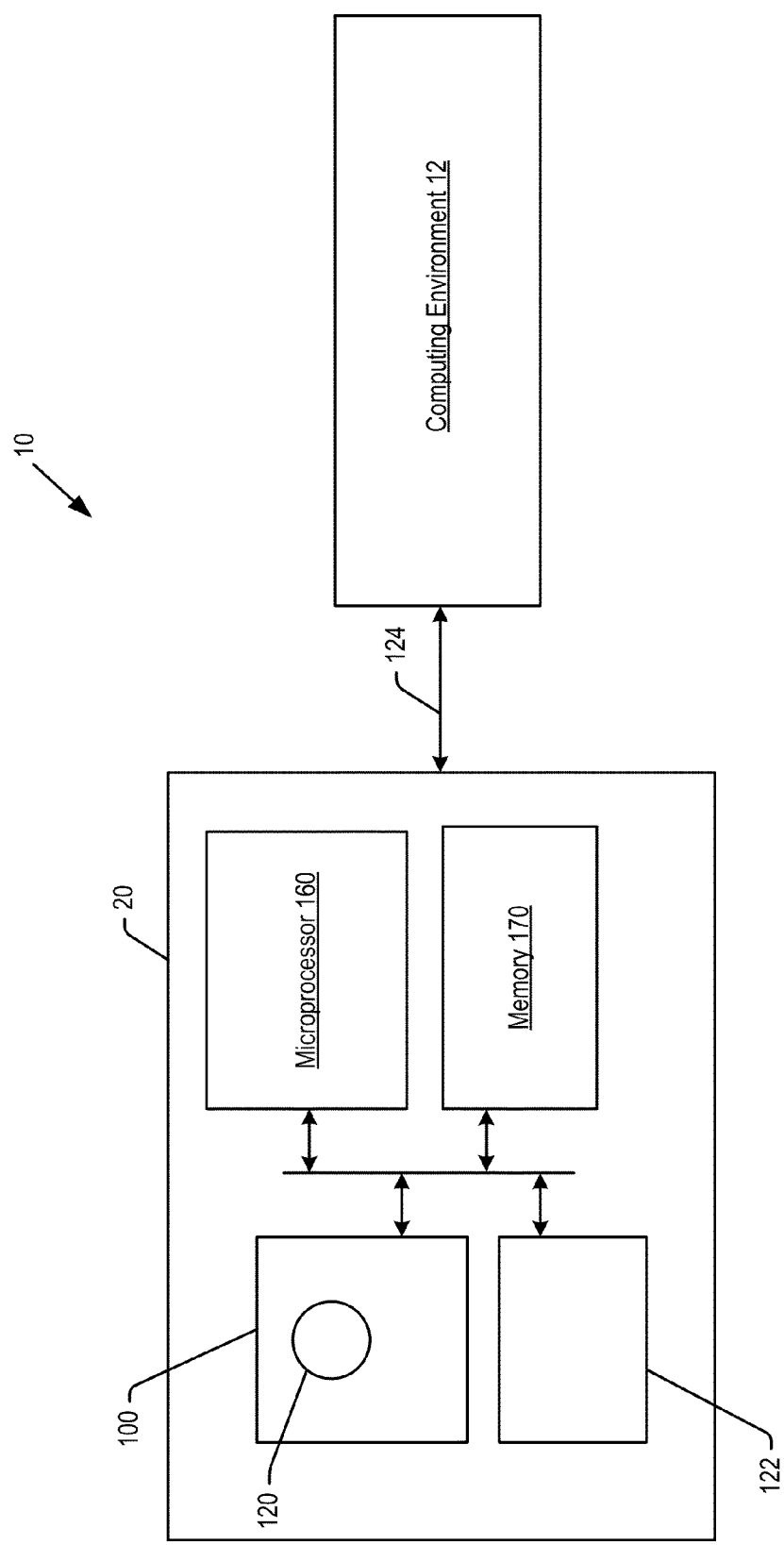
FIG. 2 illustrates an example embodiment of a capture device that may be used in a target recognition, analysis, and tracking system.

Referring to FIGS. 1 and 2, embodiments of the present disclosure may be provided as part of a TOF 3-D camera used to track moving targets in a target recognition, analysis, and tracking system 10. The system 10 may provide a natural user interface (NUI) for gaming and other applications. However, it is understood that the system of the present disclosure may be used in a variety of applications other than a target recognition, analysis, and tracking system 10.

The target recognition, analysis, and tracking system 10 may be used to recognize, analyze, and/or track a human target such as the user 18, as well as other stationary or moving objects such as objects 23. Embodiments of the target recognition, analysis, and tracking system 10 include a computing device 12 for executing a gaming or other application. The computing device 12 may include hardware components and/or software components such that computing device 12 may be used to execute applications such as gaming and non-gaming applications. In one embodiment, computing device 12 may include a processor such as a standardized processor, a specialized processor, a microprocessor, or the like that may execute instructions stored on a processor readable storage device for performing processes of the system 10 when active.

The system 10 further includes a capture device 20 for capturing image and audio data relating to one or more users and/or objects sensed by the capture device. In embodiments, the capture device 20 may be used to capture information relating to body and hand movements and/or gestures and speech of one or more users, which information is received by the computing device 12 and used to render, interact with and/or control aspects of a gaming or other application. Examples of the computing device 12 and capture device 20 are explained in greater detail below.

Embodiments of the target recognition, analysis and tracking system 10 may be connected to an audio/visual (A/V) device 16 having a display 14. The device 16 may for example be a television, a monitor, a high-definition television (HDTV), or the like that may provide game or application visuals and/or audio to a user. For example, the computing device 12 may include a video adapter such as a graphics card and/or an audio adapter such as a sound card that may provide audio/visual signals associated with the game or other application. The A/V device 16 may receive the audio/visual signals from the computing device 12 and may then output the game or application visuals and/or audio associated with the audio/visual signals to the user 18. According to one embodiment, the audio/visual device 16 may be connected to the computing device 12 via, for example, an S-Video cable, a coaxial cable, an HDMI cable, a DVI cable, a VGA cable, a component video cable, or the like.

In an example shown in FIG. 1, the capture device 20 is used to generate depth images in a NUI system where, for example, a user 18 is scrolling through and controlling a user interface 21 with a variety of menu options presented on the display 14. The computing device 12 and the capture device 20 may be used to recognize and analyze movements and gestures of a user's body, and such movements and gestures may be interpreted as controls for the user interface. The computing device 12, the A/V device 16 and the capture device 20 may alternatively or additionally cooperate to render an avatar or on-screen character on display 14. The user's movements are tracked and used to animate the movements of the avatar. In embodiments, the avatar mimics the movements of the user 18 in real world space so that the user 18 may perform movements and gestures which control the movements and actions of the avatar on the display 14.

Suitable examples of a system 10 and components thereof are found in the following co-pending patent applications, all of which are hereby specifically incorporated by reference: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; and U.S. patent application Ser. No. 12/391,150, entitled "Standard Gestures," filed Feb. 23, 2009.

FIG. 2 illustrates an example embodiment of the capture device 20 that may be used in the target recognition, analysis, and tracking system 10. In an example embodiment, the capture device 20 may be configured to capture video having a depth image that may include depth values via techniques such as TOF. According to one embodiment, the capture device 20 may organize the calculated depth information into "Z layers," or layers that may be perpendicular to a Z-axis extending from the depth camera along its line of sight. X and Y axes may be defined as being perpendicular to the Z axis. The Y axis may be vertical and the X axis may be horizontal. Together, the X, Y and Z axes define the 3-D real world space captured by capture device 20.

Capture device 20 may include a phase-shift TOF depth imaging system 100, details of which are explained in greater detail below. Capture device 20 may also include an RGB camera 122 for capturing a color map of a scene. A microprocessor 160 may further be provided as part of, or in communication with, depth imaging system 100 and/or RGB camera 122. While called a microprocessor, element 160 may be or include a standardized processor, a specialized processor, a microprocessor, or the like that may execute instructions that may include instructions for determining a depth image as explained below. It is understood that some or all of the processes described below as being performed by microprocessor may alternatively be performed by a processor of the computing device 12

The capture device 20 may further include a memory component 170 that may store the instructions that may be executed by the processor 160, images or frames of images captured by the depth imaging system 100 or RGB camera 122, or any other suitable information, images, or the like. According to an example embodiment, the memory component 170 may include random access memory (RAM), read only memory (ROM), cache, Flash memory, a hard disk, or any other suitable storage component. As shown in FIG. 2, in one embodiment, the memory component 170 may be a separate component in communication with the depth imaging system 100 and the processor 160. According to another embodiment, the memory component 170 may be integrated into the processor 160 and/or the depth imaging system 100.

As shown in FIG. 2, the capture device 20 may be in communication with the computing device 12 via a communication link 124. The communication link 124 may be a wired connection including, for example, a USB connection, a Firewire connection, an Ethernet cable connection, or the like and/or a wireless connection such as a wireless 802.11b, g, a, or n connection.

Further details of an example of depth imaging system 100 will now be explained with reference to FIG. 3. Depth imaging system 100 may be fabricated on an IC 110 that includes a two-dimensional array 130 of pixel detectors 140, which pixel detectors may be single-ended or differential in operation. Preferably each of the pixel detectors 140 has dedicated circuitry 150 for processing detection charge output by the associated detector. IC 110 preferably also includes a microprocessor or microcontroller 160, memory 170, a high speed distributable clock 180, and various computing and input/output (I/O) circuitry 190. Among other functions, processor 160 may perform distance to object and object velocity calculations.

Under control of microprocessor 160, optical energy source 120 is periodically energized by an exciter 115, and emits modulated optical energy toward an object target 23. Light source 120 may be at least one LED or laser diode(s) emitting low power (e.g., 1 W) periodic waveform, producing optical energy emissions of known frequency (for example 50 MHz to 100 MHz) for a time period known as the shutter time (for example a few ms or less) These frequencies and shutter times are by way of example only, and may vary outside of these values in further embodiments. Typically source 120 operates in the near IR, with a wavelength of perhaps 800 nm, though these values may vary in further embodiments. A lens 125 may be used to focus the emitted optical energy.

Some of the emitted optical energy (denoted $S_{out}$) will be reflected (denoted $S_{in}$) off the surface of a target object, for example the target object 23 shown in the figures. This reflected optical energy $S_{in}$ will pass through an aperture field stop and lens, collectively 135, and will fall upon two-dimensional array 130 of pixel or photodetectors 140. When reflected, optical energy $S_{in}$ impinges upon photodetectors 140 in array 130, photons within the photodetectors are released, and converted into tiny amounts of detection current. For ease of explanation, incoming optical energy may be modeled as $S_{in}=A\cos(\omega t+\theta)$, where A is a brightness or intensity coefficient, $\omega t$ represents the periodic modulation frequency, and $\theta$ is phase shift. As distance Z changes, phase shift $\theta$ changes. FIGS. 4 and 5 depict a phase shift $\theta$ between emitted and detected signals. The phase shift $\theta$ data can be processed to yield Z depth information. Within array 130, pixel detection current can be integrated to accumulate a meaningful detection signal, used to form a depth image. In this fashion, TOF depth imaging system 100 can capture and provide Z depth information at each pixel detector 140 in sensor array 130 for each frame of acquired data.

Figure 6:
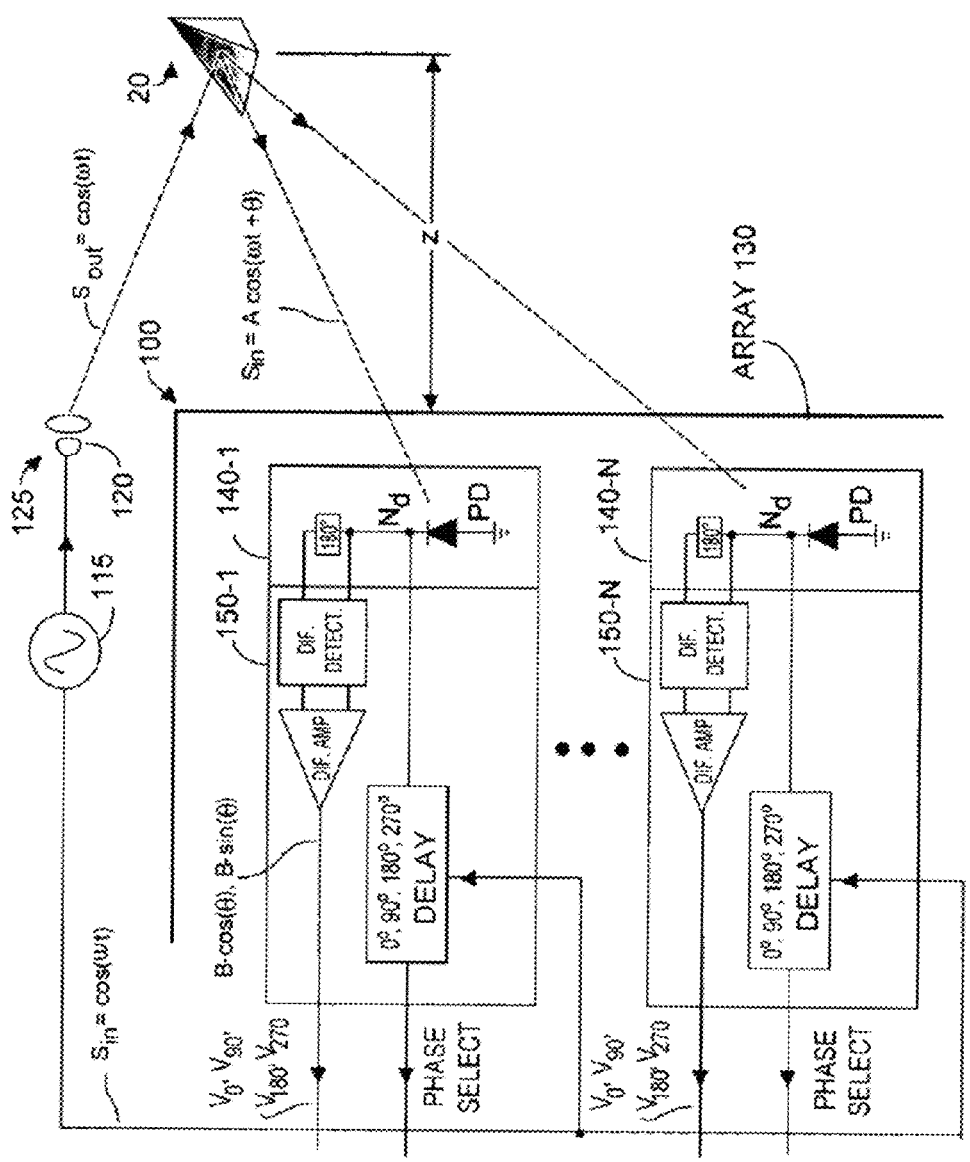
FIG. 6 illustrates details of exemplary phase capture at various phases according to embodiments of the present technology.

The phase shift $\theta$ for a given modulated frequency may be measured by sampling the received signal at N equidistant measurement phase points. FIG. 6 shows two of the many photodetectors (PD) in array 130, namely photodetectors 140-1, and 140-N, as well as some of their associated electronics, namely 150-1, 150-N. This particular embodiment employs quantum efficiency (QE) modulated differential photodetectors or pixel detectors 140, whose pixel detection information may be captured at N=4 discrete phases 0° and 180°, and 90° and 270°. Four other equidistant phase points may be selected. In further embodiments, N may be other values, such as for example N=2, in which case the phases may be 0° and 90°.

The detection phase data that is captured at the discrete frequencies is denoted herein as captures $C^0$ and $C^{180}$, $C^{90}$ and $C^{270}$. Acquisition using four phases is provided so as to remove so-called fixed pattern offset. The $C^0$ acquisition yields data but may include an error offset from zero, e.g., the value $C^0$ may not be zero when there is no signal to be detected. By the same token, the $C^{180}$ acquisition may have the same, but inverted, data and will have the same fixed pattern offset. Advantageously by subtracting ($C^0$-$C^{180}$) and preferably also subtracting ($C^{90}$-$C^{270}$) phase and Z data information is preserved but the fixed pattern offset is canceled out.

The configuration and operation of what is shown in FIG. 6 is similar to what is described with respect to the fixed phase delay embodiment of FIG. 10 in earlier-referenced U.S. Pat. Nos. 6,580,496 and 7,906,793. In FIG. 6, detection-generated photocurrent from each QE-modulated differential pixel detector, e.g., 140-1, is differentially detected (DIF. DETECT) and differentially amplified (AMP) to yield signals B cos($\theta$), B sin($\theta$), where B is a brightness coefficient. A fixed discrete 0° or 90° phase shift delay (DELAY), or alternatively a fixed 0° or 180 or 90° or 270° phase shift is switchably insertable responsive to a phase select control signal (PHASE SELECT) that can be commanded by clock circuit 180 (FIG. 3). Phase data, e.g., $C^0$ and $C^{180}$, $C^{90}$ and $C^{270}$, is acquired or captured from the pixel detectors at these discrete phases. A more detailed description of such phase detection may be found in the above-referenced patents, but without limitation, the fixed discrete phase shifts may be inserted by clock circuit 180, whose signal is used to drive detector array 130, or may be introduced by exciter 115.

Given the above, phase shift θ in FIG. 6 can be computed from captures $C^0$, $C^{90}$, $C^{180}$ and $C^{270}$ as follows:

$$\theta = \alpha \tan 2(C^{90} - C^{270}, C^0 - C^{180}) \quad (1)$$

where α is a constant multiplier and tan 2(X,Y) is the trigonometric function corresponding to tan (Y/X).

It is understood that the present technology may calculate multiphase TOF data by other methods, including for example from single-ended phase detectors, as well as from detection systems that do not employ QE modulation detection.

In practice, changes in the measured distances Z to an object produce changes in phase shift θ. However, eventually the phase shift begins to repeat, e.g., θ=θ+2π, etc. Thus, distance Z is known modulo 2πC/(2ω)=C/(2f), where f is the modulation frequency. As such, if system 100 reports a distance $Z_1$, in reality the actual distance may be any of $Z_N = Z_1 + NC/(2f)$, where N is an integer. As discussed in the Background section, there can be inherent ambiguity between detected values of phase shift θ and distance Z.

One known methodology to disambiguate, or de-alias, the phase shift data is to use multiple modulation frequencies. An example is explained below, but in general low modulation frequencies may be useful in that the relevant distances being measured may all be within a phase shift of θ≤2π. However, a problem with using low modulation frequency is that it is difficult to measure distances Z with acceptable accuracy. High modulation frequencies provide more accurate Z distance measurements, but may result in multiple distances $Z_N = Z_1 + NC/(2f)$ for the measured phase shift. However, by using multiple modulation frequencies, and comparing the results, accurate and disambiguated Z measurements may be obtained.

While such multiple frequency methods may be effective at de-aliasing phase shift data, the use of multiple frequencies consumes relatively large amounts of power. In particular, the light source 120 emits multiple frequencies of light each image frame in conventional systems which are then used to de-alias the phase shift data. As explained below with reference to FIGS. 3 and 6-11, the present technology allows for de-aliasing of phase shift data using multiple frequency methods, but at a fraction of the power consumed by conventional methods.

In embodiments, the present technology accomplishes this by emitting a single frequency each image frame, but different frequencies are used over multiple frames, which different frequencies are used for de-aliasing. In the following described example, three different frequencies are used over three different image frames. However, as further described, the number of different frames and frequencies used to de-alias the phase shift data may be 2 or 4 in further embodiments. It is understood that the number of frequencies and frames used may be more than 4 in still further embodiments.

As noted above, given phase shifts θ are indicative of certain Z distances, or modulos thereof, and phase shift θ may be plotted on a graph versus Z distances, as shown for example in FIGS. 7-10. It is understood that the following takes place to determine Z distance values as measured by each pixel detector 140 in the array 130 (FIG. 3) of the depth imaging system 100. Different pixel detectors 140 may receive light reflected from different parts of an object or different objects. As such, different pixel detectors may measure different phase shifts and different Z distances. The following describes the operation with respect to a single pixel detector 140.

Referring initially to FIG. 7, at a first image frame at time $t_1$, the optical source may emit light at a first frequency $f_1$. The light at frequency $f_1$ reflects off of an object, is received in a pixel detector 140, and the phase shift θ is calculated for that frequency as described above. The phase shift θ for frequency $f_1$ may be indicative of one or more possible Z distance values. In the example shown in FIG. 7, the frequency $f_1$ may be selected so as to have non-repeating distance values for a given measured phase shift θ≤2π over the distances under consideration. For example, the depth imaging system 100 may be intended to measure distances of objects up to some predefined distance away from the depth imaging system. This maximum distance may for example be 15 to 20 feet, though it may be shorter or longer than that in further embodiments.

Thus, in the example of FIG. 7, using a low frequency $f_1$, the measured phase shift θ may be indicative of a single measured Z distance $z_1$. It is understood that the frequency $f_1$ may indicate multiple values of Z for the given phase shift in further embodiments.

Referring now to FIG. 8, at a second frame at time $t_2$, the optical source may emit light at a second frequency $f_2$. The light at frequency $f_2$ may reflect off of the same object as in the first frame, and the phase shift θ is calculated for that frequency as described above. It is understood that, for objects in motion, or where the depth imaging system 100 is in motion, the distance measured by a given pixel detector may have changed from the frame at time $t_1$ and the frame at time $t_2$. Methods for detecting and dealing with this scenario are explained below.

In embodiments $f_2$ may be greater than $f_1$. In the example of FIG. 8, at time $t_2$, the measured phase shift θ resulting from light reflected off of the object may be indicative of two or more measured Z distances $z_2$ and $z_3$. It is understood that the frequency $f_2$ may indicate one, or more than two, values of Z for a given phase shift in further embodiments.

Referring now to FIG. 9, at a third frame at time $t_3$, the optical source may emit light at a third frequency $f_3$. The light at frequency $f_3$ may reflect off of the same object as in the first and second frames, and the phase shift θ is calculated for that frequency as described above. In embodiments, $f_3$ may be greater than $f_1$ and/or $f_2$ (in the example shown, $f_3$ is greater than $f_1$ and $f_2$). In the example of FIG. 9, at time $t_3$, the measured phase shift θ resulting from light reflected off of the object may be indicative of two or more measured Z distances $z_4$, $z_5$, $z_6$, $z_7$ and $z_8$. It is understood that the frequency $f_3$ may indicate other numbers of Z values for a given phase shift in further embodiments.

Referring back to FIG. 3, when executed by processor 160, software 220 can alter operation of clock circuit 180 by virtue of components 210 to provide the different frequencies $f_1$, $f_2$ and $f_3$ in the different image frames at times $t_1$, $t_2$ and $t_3$. As used herein, an image frame may be the rate at which the depth imaging system 100 produces consecutive images. In one embodiment, this may be 30 frames per second, though it may be higher or lower than that rate in further embodiments. In embodiments, the frequencies $f_1$, $f_2$ and $f_3$ produced in successive frames may range between 50 MHz and 100 MHz, though one or more of the frequencies $f_1$, $f_2$ and $f_3$ may above or below that range in further embodiments.

The measured depth values for the different frequencies in the different frames ($z_1$ to $z_8$ in this example) may be stored in memory 170. In one embodiment, at time $t_3$, the microprocessor 160 may examine the calculated Z values for the current and preceding frames and determine a final Z value $z_f$ indicative of the de-aliased distance between the depth imaging system 100 and the object, as measured at each pixel detector 140. It is understood that, given multiple frequencies over a number of image frames, the microprocessor 160 may de-alias the phase shift data to determine the final distance value $z_f$ according to a variety of methodologies. An example is set forth in U.S. Pat. No. 7,791,715 entitled "Method and System for Lossless Dealiasing in Time-Of-Flight (TOF) Systems." Other methods of de-aliasing using multiple modulation frequencies are contemplated.

In the illustrated example, data from three image frames and three discrete frequencies was used to de-alias the depth image for each pixel descriptor 140. In a next successive image frame, for example at a time $t_4$ (not shown), phase shift θ may be calculated and, from that phase shift, a Z distance (including any modulos) may also be calculated. Using the Z distance(s) from time $t_4$ and the preceding two image frames ($t_3$ and $t_2$), phase shift may be de-aliased for time $t_4$, and the depth map for the image at time $t_4$ may be determined. This process may continue, determining a phase shift and Z-distance(s) in the current frame, and de-aliasing the phase shift data using the data for the current frame and preceding frames.

In examples, the frequency for each of the frames used to de-alias phase shift data may be different. However, the group of frequencies used may repeat. Thus, in an example where the phase shift data for three frames are used to de-alias phase shift data, three different frequencies may be used, with the frequency from the first image frame being re-used in the fourth image frame, the frequency from the second image frame being re-used in the fifth image frame, and so on. Thus, for any given de-aliasing operation in this example, three different frequencies may be used. It is understood that the number of distinct frequencies used may exceed the number of image frames used to de-alias the phase shift data in further embodiments.

In the illustrated example, data from three image frames and three discrete frequencies was used to de-alias the depth image for each pixel descriptor 140. In further embodiments, two discrete frequencies may be used over two image frames to de-alias the phase shift data, or four discrete frequencies may be used over four image frames to de-alias the phase shift data. It is understood that more than four discrete frequencies over more than four image frames may be used in further embodiments.

The specific frequencies that are used in the range of discrete frequencies may vary in embodiments. In one example using three frequencies over a range of 50 MHz to 120 Mhz, $f_1$ may be 85 MHz, $f_2$ may be 105 Mhz, and $f_3$ may be 115 Mhz. Other frequencies may be used in this and other examples. As a further example, the above-mentioned U.S. Pat. No. 7,791,715 entitled "Method and System for Lossless Dealiasing in Time-Of-Flight (TOF) Systems" uses de-aliasing frequencies near to the maximum frequency of the TOF system.

Figure 11:
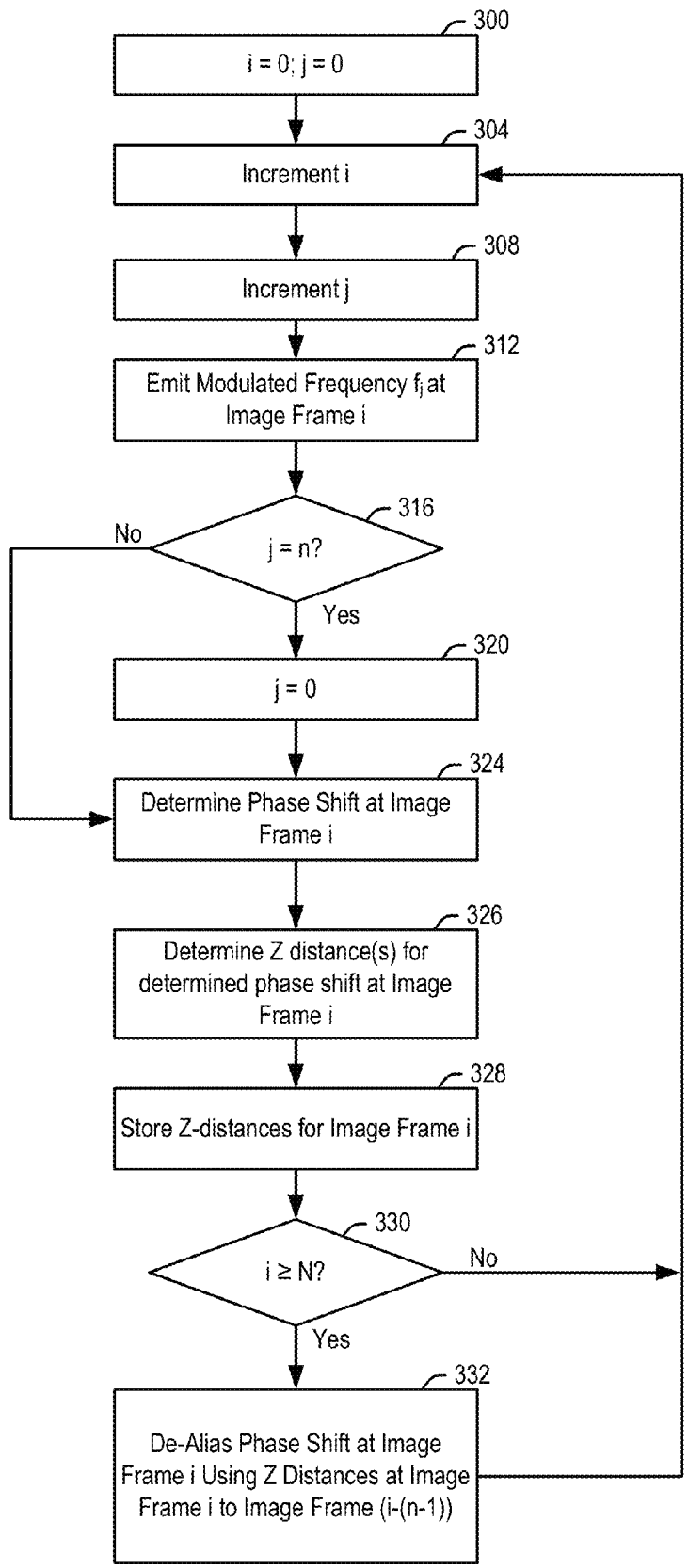
FIG. 11 is a flowchart of the operation of an embodiment of the present technology to de-alias phase shift data using multiple frequencies over multiple frames.

FIG. 11 is a generalized flowchart of the above-described process using n distinct frequencies over n different image frames to de-alias phase shift data. Given the above detailed description, steps 300 through 332 are described generally here. Counters i and j are initialized in step 300, and incremented in steps 304 and 308. In step 312, the light source 120 emits a modulated frequency $f_j$ at image frame i. Steps 316 and 320 check whether j has reached its maximum value of n. If so, j is reset to 0. In step 324, the microprocessor 160 determines phase shift for image frame i, and in step 326, the microprocessor 160 determines Z distance (including any modulos) for the phase shift for image frame i.

If not enough phase shift data has been collected in step 330 (i<n), the flow returns to step 304 to gather more phase shift data in the next image frame. On the other hand, if enough phase shift data has been collected in step 330 (i≥n), the microprocessor 160 can de-alias the phase shift data to provide the Z position for each pixel detector 140 using the determined Z distances in the current image frame and the preceding n−1 image frames. Thus, where n=3, step 332 will de-alias the phase shift data using the current image frame and the preceding two image frames. The flow then returns to step 304 to gather image data for the next image frame i.

The above-described system allows de-aliasing of phase shift data and determination of a scene depth map, while using a fraction of the power of conventional systems. Where, for example, a prior art system emitted three different modulation frequencies each image frame for de-aliasing, the present system can use one-third of the power in the operation of the depth imaging system 100. While embodiments may minimize the amount of power used by emitting a single frequency each image frame, it is understood that more than one frequency may be emitted in a single image frame in further embodiments. For example, a system may emit two distinct frequencies each image frame, and use phase shift data from three image frames for de-aliasing. Such an example uses three (or more) different frequencies to de-alias phase shift data over multiple image frames, and thus still uses less power than a conventional system which emits three frequencies of light each image frame.

Moreover, the process of dealiasing the data from multiple frequencies is a complex process using relatively large amounts of processing time and power. As the number of frequencies used is decreased per the present technology, so does the time to compute a depth map and the associated power. Comparing the single frequency depth calculation with where the object was determined to be in the previous frame uses less CPU and power resources than doing complex dealiasing. This power savings (compute power) is different from the power savings of emitting less frequencies (illumination power) per frame.

In embodiments, one or more frequencies could be emitted using previously stored data to calculate distance. For a reference frame that used $f_1$, $f_2$ and $f_3$. The depth to objects could be calculated the following depth frame sequence using one frequency $f_4$ that is set based on knowledge of the previous depth scene and the objects of interest. Also using the previous depth sequence information, the depth calculations for the newly received $f_4$ data can be refined.

The above-described system may provide the same de-aliasing accuracy as conventional systems for static objects, i.e., those for which depth data does not change over the number of image frames used to de-alias the phase shift data. However, it may happen that some objects are dynamic and not static. This may be because the object itself is moving or the depth imaging system 100 is moving. It may also be because a first object is not moving, but a second object has moved between the first object and the depth imaging system. The present system can use a variety of methodologies for recognizing a dynamic object scenario, and adjusting the phase shift de-aliasing operations accordingly.

In embodiments, the capture device 20 is able to identify and track the movement of objects relative to the capture device 20 over time. In particular, using state data from past image frames, the microprocessor 160 is able to determine movement of an object, and its rate of movement. More particularly, the capture device 20 may note that depth images registered by pixel detector 140 are changing in a pattern. Where an object is moving in the foreground, pixel detectors at a leading edge of the object will change to foreground depth measurements, while pixels at the trailing edge will change back to background depth measurements. Over time, these measurements will provide an indicator of the boundaries of the moving object as well as its rate of movement. This information may be obtained using the depth imaging system 100 by itself, or in conjunction with the RGB camera 122 (FIG. 2).

In addition or instead of the above, skeletal tracking algorithms are also known for identifying hands, head or other moving body parts. Once these body parts are identified, the measured position of static objects obscured by a moving body part may be corrected for.

The methods described in the immediately-preceding paragraphs may be used to predict, explain or confirm incongruous depth measurements sensed by a pixel detector 140. Where a pixel detector 140 has been reading a steady depth measurement to a point in a scene, and that depth measurement changes to an unexpected value, the system may treat that as a dynamic scenario for that pixel. The system may treat a dynamic scenario in at least two ways.

In one example, where it is predicted that the pixel detector has sensed a moving object at that pixel, the system may use the previous state data to alter the phase shift measurements from the preceding n image frames. This may allow the current depth image to be de-aliased using the current image frame phase shift data, and the altered phase shift data from the previous image frames.

In another example, the microprocessor 160 may disregard the depth image from a pixel detector sensing incongruous depth image relative to earlier frames. When the microprocessor again senses consistent image data (for example over n image frames), the image data from that pixel detector may again be used in the depth image. Given the vast amount depth image generated, and given that image frames refresh at a fast rate (for example 30 frames per second), disregarding the depth data for some of the pixel detectors for a few frames will not have a significant effect on the overall depth image determined by the depth imaging system 100.

Figure 12:
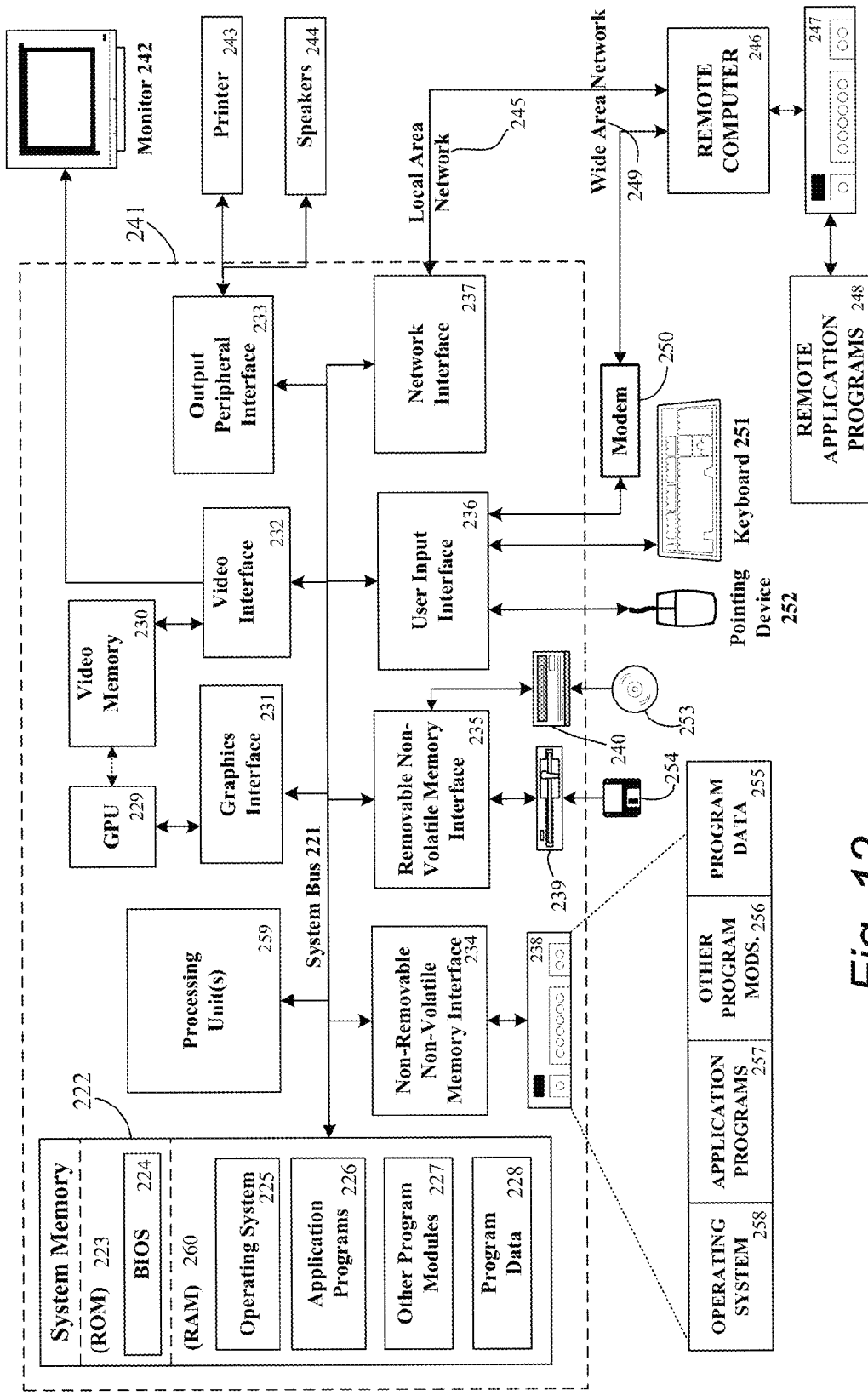
FIG. 12 illustrates an example embodiment of a computing device that may be used in embodiments of the present technology.

FIG. 12 illustrates example embodiment of a computing device 219 that may be the computing device 12 shown in FIGS. 1A-2 used to interpret one or more positions and motions in a target recognition, analysis, and tracking system. The computing device 219 is only one example of a suitable computing device and is not intended to suggest any limitation as to the scope of use or functionality of the presently disclosed subject matter. Neither does the computing device 219 have any dependency or requirement relating to any one or combination of components illustrated in the exemplary computing device 219. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 12, the computing device 219 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 12 illustrates operating system 225, application programs 226, other program modules 227, and program data 228. FIG. 12 further includes a graphics processor unit (GPU) 229 having an associated video memory 230 for high speed and high resolution graphics processing and storage. The GPU 229 may be connected to the system bus 221 through a graphics interface 231.

The computer 241 may also include other removable/non-removable, volatile/nonvolatile computer storage media. By way of example only, FIG. 12 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the Exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 12, provide storage of computer readable instructions, data structures, program modules and other data for the computer 241. In FIG. 12, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although just a memory storage device 247 has been illustrated in FIG. 12. The logical connections depicted in FIG. 12 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 12 illustrates remote application programs 248 as residing on memory device 247. It will be appreciated that the network connections shown are Exemplary and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described implementations were chosen in order to best explain the principles of the inventive system and its practical application to thereby enable others skilled in the art to best utilize the inventive system in various implementations and with various modifications as are suited to the particular use contemplated. It is intended that the scope of the inventive system be defined by the claims appended hereto.

What is claimed is:

1. A depth imaging system comprising:
   an optical energy emitter configured to emit light over a range of frequencies;
   an array of pixel detectors configured to receive light from the optical energy emitter after reflection off of an object; and
   a processor determining phase shift data in light of a first frequency, a second frequency and a third frequency received in a pixel detector of the array of pixel detectors, light of the first frequency received in the pixel detector in a first frame and not a second or third frame, light of the second frequency received in the pixel detector in the second frame and not the first or third frames, and light of the third frequency received in the third frame and not the first or second frames, the processor de-aliasing the phase shift data to determine a distance to the object indicated by the first and second frequencies at a first time, and the processor de-aliasing the phase shift data to determine a distance to the object indicated by the first and second frequencies at a second time subsequent to the first time.

2. The system of claim 1, wherein one of the first, second and third frequencies has a single distance associated with the measured phase shift within a predefined range of distances between objects in a scene and the depth imaging system.

3. The system of claim 1, wherein one of the first, second and third frequencies has multiple distances associated with the measured phase shift within a predefined range of distances between objects in a scene and the depth imaging system.

4. The system of claim 1, the processor reusing the first and second frequencies at times subsequent to the first and second times to de-alias the phase shift data.

5. The system of claim 1, the optical energy emitter emitting light between 50 MHz and 100 MHz.

6. A capture device of a target recognition, analysis, and tracking system, the capture device comprising:
   an RGB camera; and
   a depth imaging system, comprising:
      an optical energy emitter configured to emit light over a range of frequencies,
      an array of pixel detectors configured to receive the light from the an optical energy emitter configured to emit after reflection off of an object, and
      a processor determining phase shift data in light of a plurality of different frequencies received in a pixel detector of the array of pixel detectors in a plurality of successive frames, each frequency of the plurality of different frequencies received in a different frame of the plurality of successive frames, the processor dealiasing the phase shift data to determine a distance to the object indicated by first and second frequencies of the plurality of different frequencies at a first time, and the processor de-aliasing the phase shift data to determine a distance to the object indicated by the second frequency and a third frequency of the plurality of different frequencies at a second time different than the first time.

7. The capture device of claim 6, the processor determining phase shift data in light of a fourth frequency received in the pixel detector, the processor dealiasing the phase shift data to determine a distance to the object indicated by at least the third and fourth frequencies at a third time different than the first and second times.

8. The capture device of claim 6, the processor determining phase shift data in light of the first and second frequencies by taking sample captures at 0° and 90°.

9. The capture device of claim 6, the processor determining phase shift data in light of the first and second frequencies by taking sample captures at 0°, 90°, 180°, 270°.

* * * * *